(12) United States Patent
Roy (10) Patent No.: US 7,706,353 B2
(45) Date of Patent: Apr. 27, 2010

(54) CONGESTION CONTROL IN CONNECTION-ORIENTED PACKET-SWITCHING NETWORKS

(75) Inventor: Anindya Roy, Westford, MA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1307 days.

(21) Appl. No.: 10/762,022

(22) Filed: Jan. 21, 2004

(65) Prior Publication Data

US 2005/0157641 A1 Jul. 21, 2005

(51) Int. Cl.
*H04L 12/28* (2006.01)
(52) U.S. Cl. ...................................... 370/351
(58) Field of Classification Search ......... 370/216–235, 370/395.1, 396–398, 395.2, 395.21, 395.3, 370/395.41, 395.43, 395.61, 395.64, 235.1, 370/236.1, 236.2, 237, 238
See application file for complete search history.

(56) References Cited

U.S. PATENT DOCUMENTS

| | | | |
|---|---|---|---|
| 5,912,877 A * | 6/1999 | Shirai et al. | 370/228 |
| 6,108,304 A * | 8/2000 | Abe et al. | 370/232 |
| 6,636,487 B1 * | 10/2003 | Roy | 370/260 |
| 2003/0016808 A1 * | 1/2003 | Hu et al. | 379/221.03 |
| 2004/0228323 A1 * | 11/2004 | Acharya et al. | 370/351 |
| 2005/0160171 A1 * | 7/2005 | Rabie et al. | 709/227 |

* cited by examiner

*Primary Examiner*—Hanh Nguyen
*Assistant Examiner*—Juvena Loo
(74) *Attorney, Agent, or Firm*—Carlson, Gaskey & Olds, P.C.

(57) ABSTRACT

Congestion control in connection-oriented packet-switching networks is accomplished by rerouting any misbehaving non-real-time connection over an alternative path, if network resources permit. In one exemplary methodological implementation, a congestion notification is received by a node in a network indicating that there is traffic congestion in a path connecting the node to a destination node. The node ascertains whether an alternative path exists with better throughput for rerouting traffic between it and the destination node. The node selects the alternative path to route traffic between it and the destination node, if such an alternative path exists.

11 Claims, 5 Drawing Sheets

CONGESTION CONTROL IN CONNECTION-ORIENTED PACKET-SWITCHING NETWORKS

TECHNICAL FIELD

The invention relates generally to traffic management for connection-oriented packet switched networks, and more specifically, to traffic congestion control for such networks.

There are two basic types of packet-switching networks: connection-oriented and connectionless. In connection-oriented packet-switching networks a call (also referred to as a "connection") needs to be setup (i.e. established) between a sender (i.e. a source) and receiver (i.e. destination), before actual data packets can be sent by the source to the destination. Sequence or ordering of the data packets is maintained in such networks, as all data packets use the same connection path. On the other hand, in connectionless packet-switching networks, no advance call setup is required for sending data from a source to a destination. Each data packet can be routed independently, thus the order in which the destination may receive the packets are not guaranteed. The invention described herein is described in the context of connection-oriented packet-switching networks.

BACKGROUND

Asynchronous Transfer Mode (ATM) is a very high-speed transmission protocol developed for transferring traffic (i.e., data) in networks. ATM uses data packets, called cells, for transporting and routing traffic through a network. The fixed size of ATM cells make networks that utilize ATM (hereinafter ATM networks) very versatile, supporting the transfer of a wide variety of different types of data, including raw data, voice data, video data, image data, multimedia data, and other types of data.

As data enters an ATM network, it is typically segmented (i.e., formed) into ATM cells by the ATM Adaptation Layer (AAL) present in either an ATM device, such as a switch or router, which are devices that relay and route traffic in the network. The cells travel through the ATM network in a cell stream. As the cells exit the ATM network, they are reassembled (i.e., reformed) into a native data format. ATM networks allocate bandwidth on demand, which is particularly important for traffic that has very little predictability such as telecommunication networks. For instance, when an end system device (i.e., source node) attempts to send data to another end system (i.e., a destination node) in an ATM network, the source node typically requests the establishment of a Virtual Connection (VC), which is referred to as a call. Before the call is accepted a determination is made by the network whether or not to accept the call by examining available network resources.

The objective of the network when establishing a call is to ensure that a requested Quality of Service (QoS) is maintained for a connection between a source node and a destination node (it is noted that while the terms 'source' and 'destination' denote a traffic flow direction, it is appreciated that ATM connections support bidirectional traffic flow, and accordingly the terms 'source node' and 'destination node' can be used interchangeably). Providing the desired QoS for various traffic types involves proper traffic management. If the call is accepted, the network forms an agreement with the source node. The agreement typically stipulates that the source node shall not to exceed the specified Peak Cell Rate (PCR) for the call. The amount of bandwidth allocated depends on the connection's specified traffic parameters (a.k.a. descriptors) and the type of QoS, and can vary from the Minimum Cell Rate (MCR) to the (PCR) of the call. Broadly ATM connections can be classified into Real time and Non-real time service categories. Real Time Service categories include Constant Bit Rate (CBR) and Variable Bit Rate Real Time (VBRrt), while Non-real time service categories include Variable Bit Rate Non-Real Time (VBRnrt), Available Bit Rate (ABR) and Unspecified Bit Rate (UBR).

Typical bandwidth allocation for Non-real time services is much less than its specified PCR and close to it's MCR, which allows for accommodating a lot more VC than the actual capacity of the link/node. This is known as oversubscription of a link/node. However, not all VCs may use network resources at the same time, which results in unused bandwidth (i.e. resource). Over-subscription thus allows some VCs now to burst traffic up to their PCR and utilize the statistical fluctuation of each VCs traffic load, and thus save bandwidth. Thus, over-subscription allows the non-real time connections to burst traffic at a rate higher than its assigned bandwidth or cell rate. In other words it is possible for a non-real time connection to burst traffic up to their PCR without suffering discard at their ingress due to Usage Parameter Control (UPC).

However, if all non-real time connections start sending traffic close to their PCR, then this may lead to congestion by overloading some network link/node egress. In such congested situations, connections that are sending traffic (intentionally or unintentionally) more than their Available Cell Rate (ACR) are considered misbehaving. Though it is not mentioned explicitly, it should be appreciated that each non-real time connection needs to be individually tracked and monitored using some form of per-VC queuing architecture in the ATM node, in order to analyze which connection is misbehaving and which is not.

Traffic congestion can prevent traffic from reaching its destination and cause significant degradation to the performance on the network. For example, cells sent by the source node can be dropped during transmission. If the destination node detects errors, such as recognizing the dropped cells, it will request that the source node rebroadcast the transmission. This has a recursive effect as it results in more traffic being sent across the ATM network, creating even more congestion, which can make the congestion problem worse. Eventually, a disruptive phenomenon can propagate across the ATM network, overloading available resources with traffic cells, which are dropped as retransmissions occur. Eventually cells are retransmitted onto the network and may overlap with previous retransmissions, which causes further data backup and more cells to be dropped, yet again. Accordingly, traffic congestion can cause a network to fail if not dealt with through proper traffic management, and in particular proper congestion control.

Attempts have been made to control congestion in ATM networks. Congestion control can be applied at the call level and cell level. At the call level, Connection Admission Control (CAC) is applied to perform access admission control in deciding whether or not accept the call into the network by evaluating the resources required carefully to meet the QoS objective of the call by examining available network resources. Congestion control schemes applied at the cell level can be applied both at the "ingress" of the node and at the egress of each ATM node.

Usage Parameter Control (UPC), or in other words, traffic enforcement or policing, is a set of defined corrective actions (i.e. selective discard of the violating cells or tagging violating cells that could be discarded in downstream nodes if necessary) taken by an ATM network at the ingress of the virtual circuit or virtual path level to protect network resources from malicious as well as unintentional misbehavior, by detecting violations of negotiated traffic contracts, such as sending traffic more than the specified PCR. However, as discussed previously in context of network node oversubscription, a connection may be sending traffic within the connection's PCR and thus may be conforming to the connection's UPC but may still contribute to congestion at some intermediate network node egress. In such situations congestion control is applied at the congested egress.

Open Loop Flow Control is one such approach used to regulate the traffic locally by decreasing (a.k.a. throttling) the outgoing (i.e. egressing) traffic rate of the misbehaving connection by restricting the egressing (i.e. outgoing) traffic for that connection and discarding the excess traffic at the congested node. Though this mechanism is useful in preventing congestion from further percolation in the downstream direction, it lacks the ability to regulate traffic flow at the very source of the connection.

Closed Loop Flow Control addresses the limitation of the Open Loop Flow Control as in this mechanism sources of congestion are informed about the congestive state of the network through feedback and are requested to decrease their input rate. The main advantage of a feedback mechanism is that if a certain node in a network is congested, then the congestion can be moved from the node experiencing traffic congestion (referred to as the "point-of-congestion") back to the source of the congestion.

Often to relieve a point of congestion in a faster manner, certain congestion control techniques do not discriminate between conforming and non-conforming connections and may force overall reduction in cell transfer rate at the congested node. This penalizes the non-misbehaving connections by forcing them to reduce their overall cell transfer rates, even though they may not be misbehaving.

Other congestion control mechanisms for ATM networks have been developed or proposed to perform congestion control, such as cell buffering techniques, cell disposal policing techniques, artificial intelligence prediction techniques, and various other congestion control techniques. Most, if not all of these congestion mechanisms, either reduce the cell rate of nodes in a call's particular connection path or link to alleviate congestion or perform other procedures that degrade the overall performance of networks and do not consider unutilized resources across the entire network.

SUMMARY

Congestion control in connection-oriented packet-switching networks is accomplished by rerouting a misbehaving connection over an alternative path, if network resources permit. For example, traffic associated with a misbehaving connection is rerouted over an alternative path in accordance with the principles of the invention, if network resources permit, instead of automatically reducing the cell rate of the misbehaving connection as described in the Background section. In the context of congestion in an ATM network, a misbehaving connection means that a non-real time connection is receiving more traffic than its currently assigned Cell Rate, also known as the Available Cell Rate (ACR).

If an alternative path is selected to reroute traffic, the misbehaving connection may not need to undergo a cell rate reduction, thereby enhancing throughput and overall network performance. Even if a cell rate reduction is necessary when rerouting a misbehaving connection, considering and selecting alternative paths for the transfer of traffic in accordance with the invention described herein may offer better throughput than conventional solutions that base their rate control decision only on available resources in the particular path/link experiencing the congestion.

In one exemplary methodological implementation, a notification is received by a node in a network indicating that there is traffic congestion in a path connecting the node to a destination node. The node ascertains whether an alternative path exists with better throughput for routing traffic between it and the destination node. The node selects the alternative path to route traffic between it and the destination node, if such an alternative path exists.

BRIEF DESCRIPTION OF THE DRAWINGS

The detailed description is described with reference to the accompanying figures. In the figures, the left-most digit(s) of a reference number identifies the figure in which the reference number first appears.

DETAILED DESCRIPTION

The invention described herein is described in the context of connection-oriented packet-switching networks, including, but not limited to, multi-protocol label switching (MPLS), Frame Relay, X.25, Asynchronous Transfer Mode (ATM), and other connection-oriented packet-switching networks. Additionally, the invention described herein relies on connection-oriented packet-switching networks that have some capability to inform/notify the source node about a misbehaving connection/circuit. In other words, these connection-oriented packet-switching networks support some form of closed-loop congestion control or other feedback mechanism.

For purposed of discussion, the embodiments described herein are described in conjunction with ATM network technology, although it is appreciated that the concepts and operation of the claimed invention can be applied to other connection-oriented packet-switching network technologies.

Figure 1A:
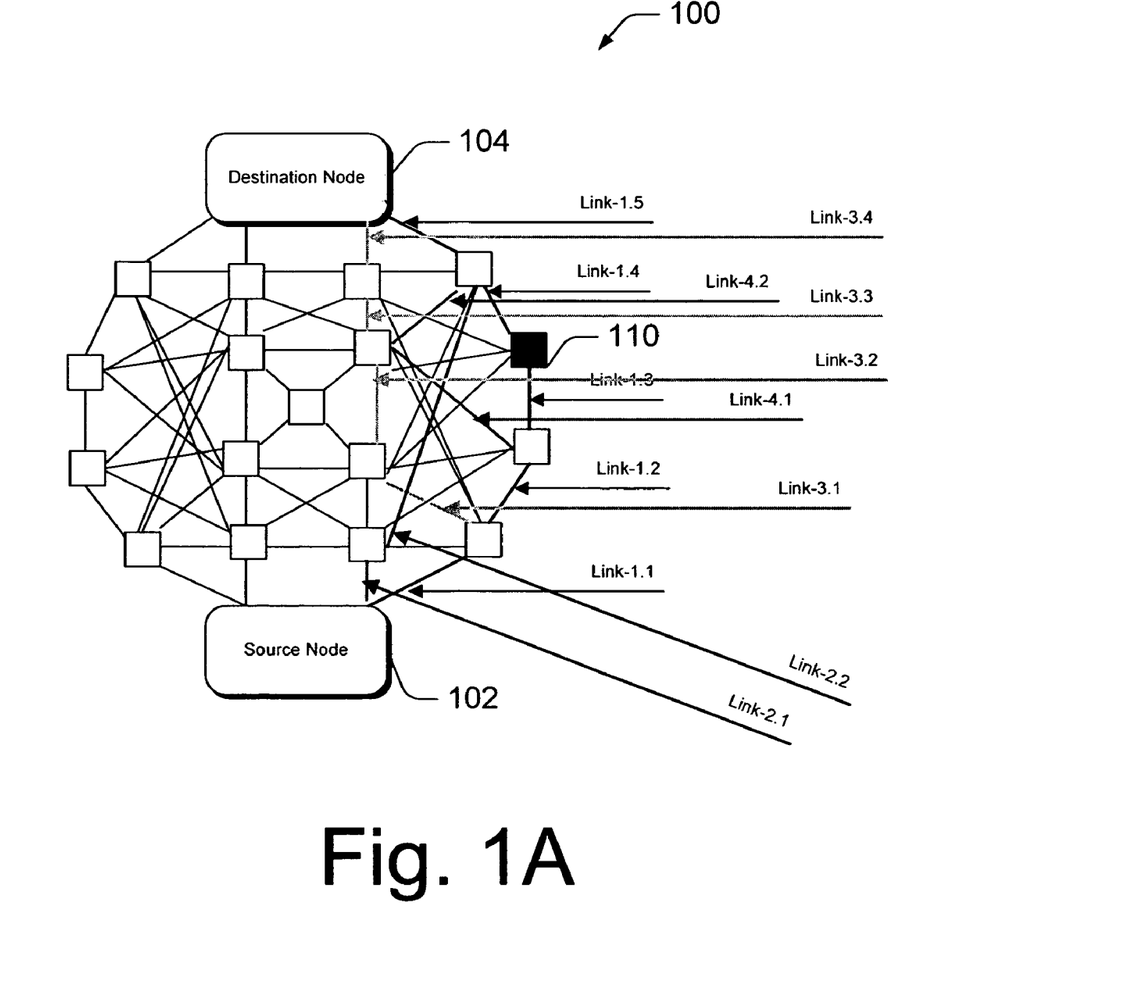
FIG. 1A illustrates select elements of an exemplary network in which congestion control, based on rerouting misbehaving connections, can be implemented.

FIG. 1A illustrates select elements of an exemplary network 100 in which congestion control, based on rerouting misbehaving connections, can be implemented. Network 100 generally represents a broadband network, and in particular, an ATM network. Network 100 may use wired, wireless, or optical technologies, or any combination of thereof for interconnecting elements therein. For purposes of discussion, network 100 includes a source node 102 for transferring data to a destination node 104. Both the source node 102 and destination node 104 may represent any node in an ATM network including virtual nodes.

Figure 1B:
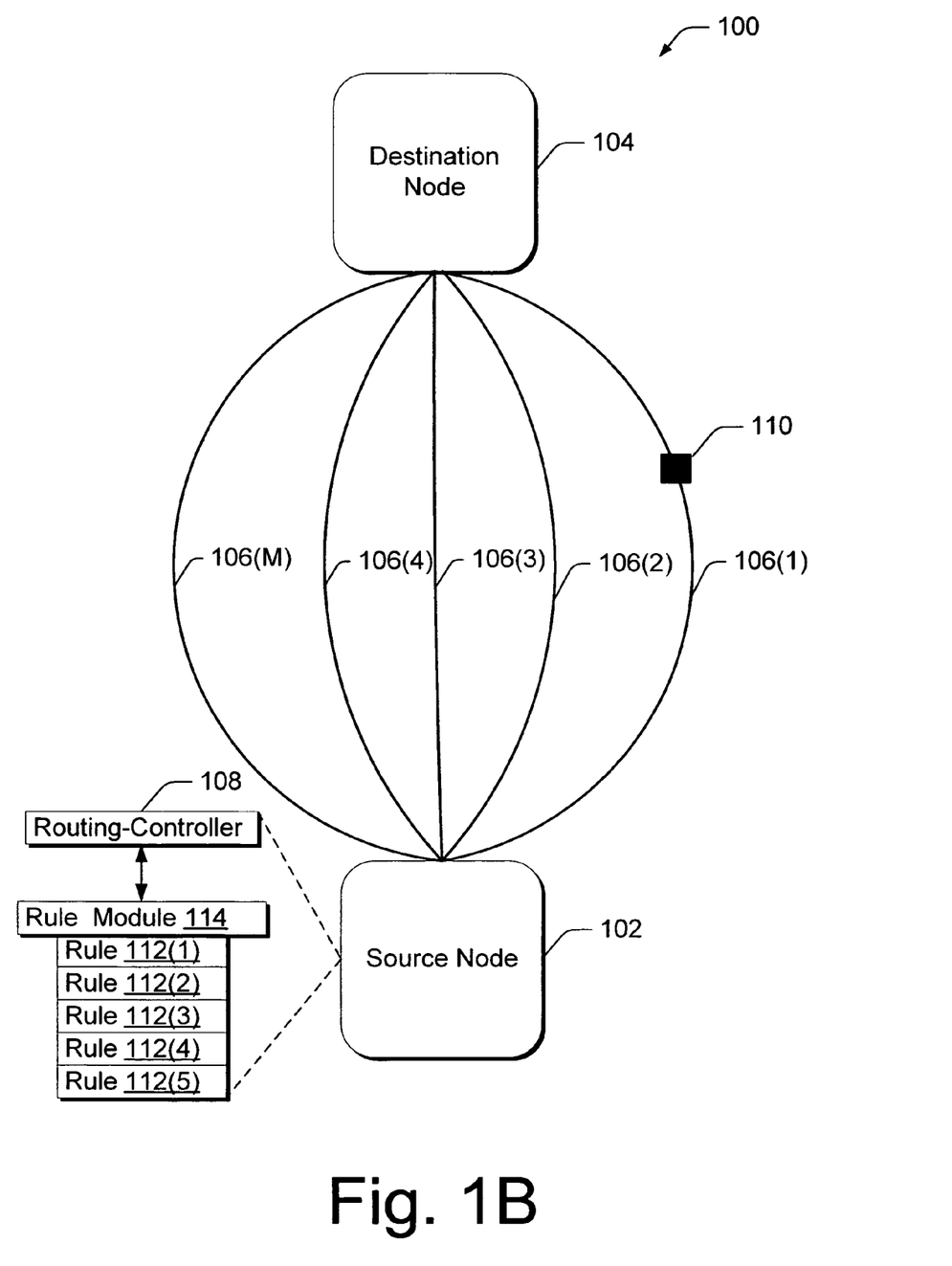
FIG. 1B is a simplified version of FIG. 1A and shows multiple connection paths between a source node and a destination node.

Located in between source node 102 and destination node 104 are various paths for connecting source node 102 to destination node 104. For example, FIG. 1B is a simplified version of FIG. 1A and shows multiple connection paths 106(1), 106(2), 106(3), 106(4), ..., 106(M) between source node 102 and destination node 104. Each path, referred to generally as reference number 106, represents a virtual path or a virtual circuit connection, between source node 102 and destination node 104. That is, each path 106 represents a non-real time connection between source node 102 and destination node 104 that includes links or cell trunks between one or more intermediary nodes, which are denoted as squares in FIG. 1A. For instance, referring to both FIGS. 1A and 1B, path 106(1) consists of (Link 1.1,1.2,1.3,1.4,1.5), path 106(2) consists of (Link 2.1,2.2,1.5), path 106(3) consists of (Link 1.1,3.1,3.2,3.3,3.4), Path 106(4) consists of (Link 1.1,1.2,4.1,4.2,1.5), and so forth. Thus, although FIG. 1B shows only the multiple connection paths 106(1), 106(2), 106(3), 106(4), ..., 106(M) between source node 102 and destination node 104, it is appreciated that paths 106 include one or more links and intermediary nodes, which are illustrated in FIG. 1A.

Referring primarily to FIG. 1B, source node 102 generally includes a routing-controller 108, which is a module located within source node 102 that may be implemented in hardware, software, firmware, logic, or any combination thereof. Routing-controller 108 performs congestion control from the perspective of the source node 102, but also provides benefits to network 100 in terms of improved throughput performance.

Briefly, routing-controller 108 is configured to receive a notification of traffic congestion from a point-of-congestion 110 in a first path, such as path 106(1) connecting source node 102 to destination node 104. The notification may be received through feedback techniques, such as closed loop feedback techniques. For example, notification of traffic congestion can be accomplished by having source node 102 send a resource management (RM) cell requesting a desired ACR. If the response to the RM cell request contains appropriate congestion feedback information indicating congestion in the congestion indication field, then source node 102 would receive "notification" of congestion in response to the request. Accordingly, at some time t, path 106(1) is identified as misbehaving for contributing to congestion.

In response to the notification, routing-controller 108 ascertains whether an alternative path (106(2), 106(3), ..., or 106(M)) exists with better throughput characteristics for routing traffic to destination node 104 than path 106(1). As used herein, better throughput characteristics, generally means a path that has more bandwidth, and hence can offer a higher Available Cell Rate (ACR) and the total bandwidth (i.e., physical capacity of the path not the available bandwidth in the path) is greater or equal to the specified Peak Cell Rate (PCR) of the connection. This means the path can offer a cell rate that is more than the highest possible ACR available for path 106(1).

If routing-controller 108 ascertains that there is an alternative path with better throughput characteristics, then routing-controller 108 will select the alternative path (e.g., select either path 106(2), 106(3), ..., or 106(M)) to route traffic. Routing-controller 108 uses a rule module 114 (which may reside within the routing-controller 108 or be accessible thereto) to select a particular alternative path to reroute traffic. Rule module 114 contains one or more rules 112(1), 112(2), 112(3), 112(4), ..., 112(N), typically in the form of coded instructions and/or logic stored on some type of computer-readable medium. If more than one path is available, then routing-controller 108 will use one or more rules contained in rule module 114 to control which one of the particular paths is selected. Any number of implementation specific rules, referred to generally as reference number 112, may be used to decide which of the multiple paths to choose.

For example, in one implementation, rule 112(1) represents a best-fit rule in one of the alternative paths 106 is selected to reroute the traffic, based on determining which the alternative paths has the maximum amount of unreserved resources. For example, suppose that alternative path 106(2) has the most unreserved resources for transferring traffic when compared to two other possible alternative paths alternative paths 106(3) and 106(4). Based on rule 112(1), the best-fit rule, routing-controller 108 will select alternative path 106(2) over alternative paths 106(3) or 106(4). One advantage of choosing the best-fit path is that the connection can potentially reach its highest possible ACR (i.e. a cell rate close to its PCR) than its current ACR.

In one implementation, rule 112(2) represents a worst-fit rule. In accordance with the worst-fit rule, one of the alternative paths 106 is selected to reroute the traffic, based on determining which of the alternative paths has the minimum amount of unreserved resources. For example, suppose that alternative path 106(2) has the least number of unreserved resources for transferring traffic when compared to two other possible alternative paths alternative paths 106(3) and 106(4). Based on the worst-fit rule, routing-controller 108 will select alternative path 106(2) over alternative paths 106(3) or 106(4).

In one implementation, rule 112(3) represents a first-fit rule. In accordance with the first-fit rule, the first path found to satisfy the ACR requirements for the connection between source node 102 and destination node 104 is chosen as the alternative path to reroute traffic regardless if there are other alternative paths, which may also satisfy the ACR requirements. For example, suppose routing-controller 108 desires an alternative path with 10 buckets for conveying traffic. Also suppose that alternative path 106(2), and alternative path 106(3) only have five buckets for conveying traffic, but alternative path 106(4) has 20 buckets and alternative path 106(M) has exactly 10 buckets. Suppose also that routing-controller 108 first encounters alternative path 106(4). Accordingly, routing-controller 108 will select alternative path 106(4) since it encounters this path first, even though alternative path 106(M) matches the requirements exactly.

In one implementation, rule 112(4) represents a custom-fit rule. In accordance with this rule, routing-controller 108 will select alternative paths based on some type of custom criteria. For example, suppose that for a static network topology alternative paths are set-up in some sequential list, in which a certain sequence of paths will be chosen in a certain order of preference. Those available alternative paths with a higher preference levels are selected before lower preference level alternative paths.

In one implementation, rule 112(5) represents a fuzzy-set rule. In accordance with this rule, routing-controller 108 will select alternative paths based on some type of fuzzy rule set that may include some combination of different rules. Based on some type of fuzzy variable (such as speed, bandwidth, jitter, etc.), the fuzzy-set rule will select an alternative path. One advantage of the fuzzy rule set is that multiple rules define the action to be taken instead of relying on only one specific rule to define an action.

Figure 2A:
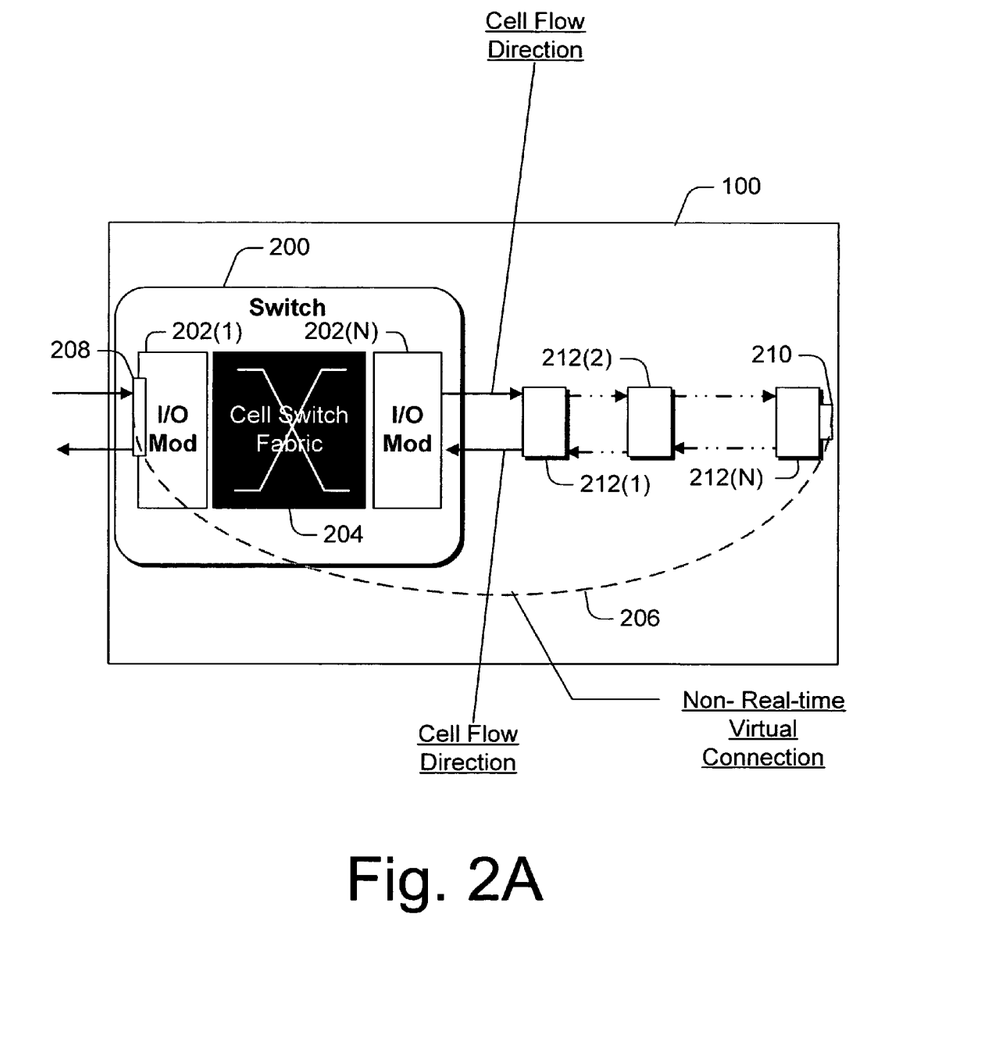
FIG. 2A illustrates an exemplary physical representation of an ATM switch used to implement a source node in a network for a non-real time virtual connection.

FIG. 2A illustrates an exemplary physical representation of an ATM switch 200 used to implement a source node 102 in a network 100. In particular, each ATM switch 200 may include multiple Input/Output (I/O) modules 202(1), ..., 202(N) each consisting of one or more standard ATM physical interfaces (not shown). ATM Cell Switching Fabric 204 forms the basis of cell switching in an ATM switch.

Each I/O Module contains one or more high-speed processors (shown in FIG. 2B), which may be used in parallel or sequential modes to carry out operations encoded either in hardware, firmware, logic, embedded software, or a combination thereof. User defined non-real time virtual connection 206 is defined between two standard based User Network Interface (UNI) endpoints 208 and 210. Depending on the direction of traffic flow, any one of these UNI endpoints 208 or 210 may be considered as the source endpoint and the ATM switch or node in which it is configured can be considered as the source node. In this discussion endpoint 208 has been arbitrarily chosen as the source node. The connection 206 traverses over network 100 (also shown in FIG. 1A and FIG. 1B), of multiple interconnected nodes 212(1), 212(2), and 212(N).

Figure 2B:
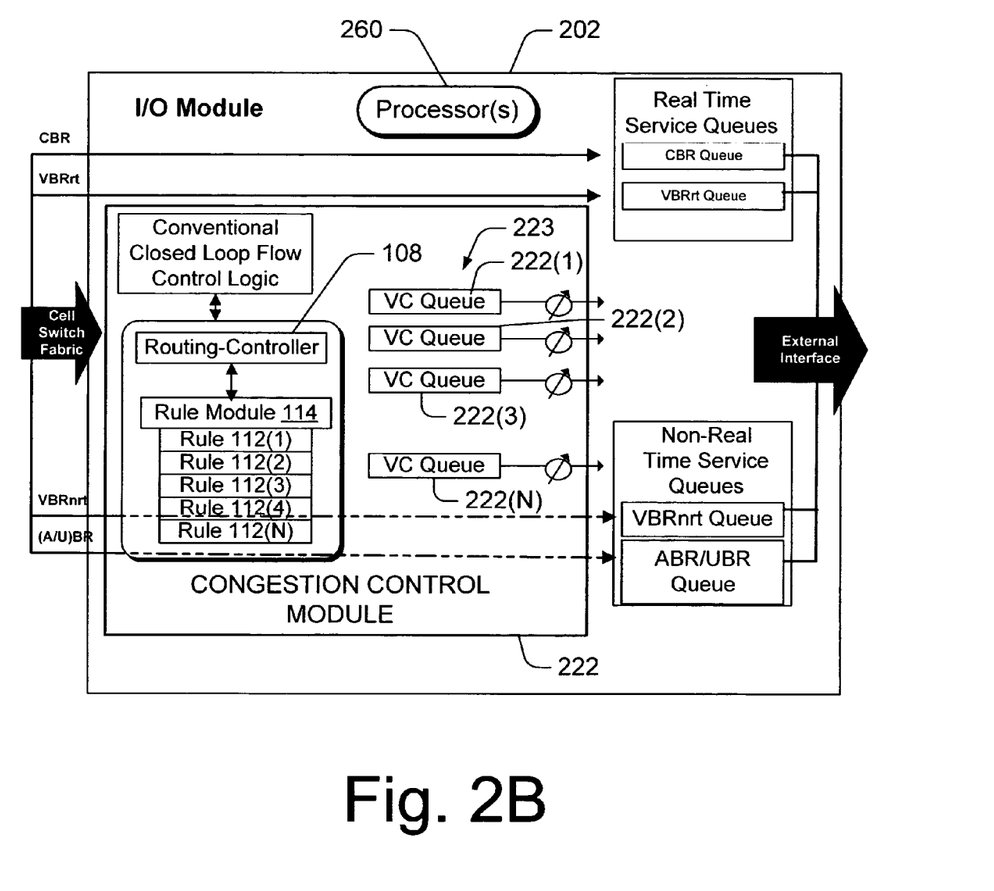
FIG. 2B illustrates an exemplary physical representation of an I/O module in which a congestion control module incorporating a routing-controller can be implemented. The congestion control module is generally applicable in the egress direction (i.e., for traffic flowing out of the switch).

FIG. 2B illustrates an exemplary physical representation of an I/O module 202 in which a congestion control module 222 incorporating a routing-controller 108 can be implemented. Control module 222 also includes an egress buffer (i.e., memory) 223 for supporting a per-VC queuing architecture to enable I/O module 202 to monitor and control each non-real time virtual connection. In particular, egress buffer 223 includes per-VC queues 224(1), 224(2), 224(3), . . . , 224(N) which are an abstract representation of individual VC queues that physically exists in the egress buffer 223 present in the I/O module. It is the per-VC architecture in each ATM I/O module, which assists ATM switch 200 in deciding which egressing connection is misbehaving and which is not by examining the current queue length with respect to their allowable queue length. Flow control is applied across non-real time connections and not across the real time connections.

In the illustrative implementation routing-controller 108 is implemented as a program module that may be described in the general context of computer-executable instructions, being executed by ATM switch 200, i.e., by one or more processors 260 in ATM switch 200. Additionally, even though routing-controller 108 is illustrated herein as a discrete block, it is recognized that any of these components may reside at various times in different storage components (i.e., a variety of computer-readable media including both volatile and non-volatile media, removable and non-removable media). Alternatively, routing-controller 108 can also be implemented in hardware, firmware, logic, software, or any combination of thereof. Accordingly, it is noted that FIGS. 2A and 2B represent one of many possible computer platforms that a routing-controller 108 can be implemented, and other computer platforms having some form of data storage and one or more processors could represent ATM switch 200 (i.e., source node 102), including, but not limited to, a router, a switch, a server, a multiprocessor system, a computer, and other computer platforms that may operate as a node in an ATM network 100.

Having introduced physical and/or virtual representations of a source node, it is it is now possible to describe how congestion control can be implemented in accordance with a methodical implementation. Methods of controlling traffic congestion may be described in the general context of computer-executable instructions.

Figure 3:
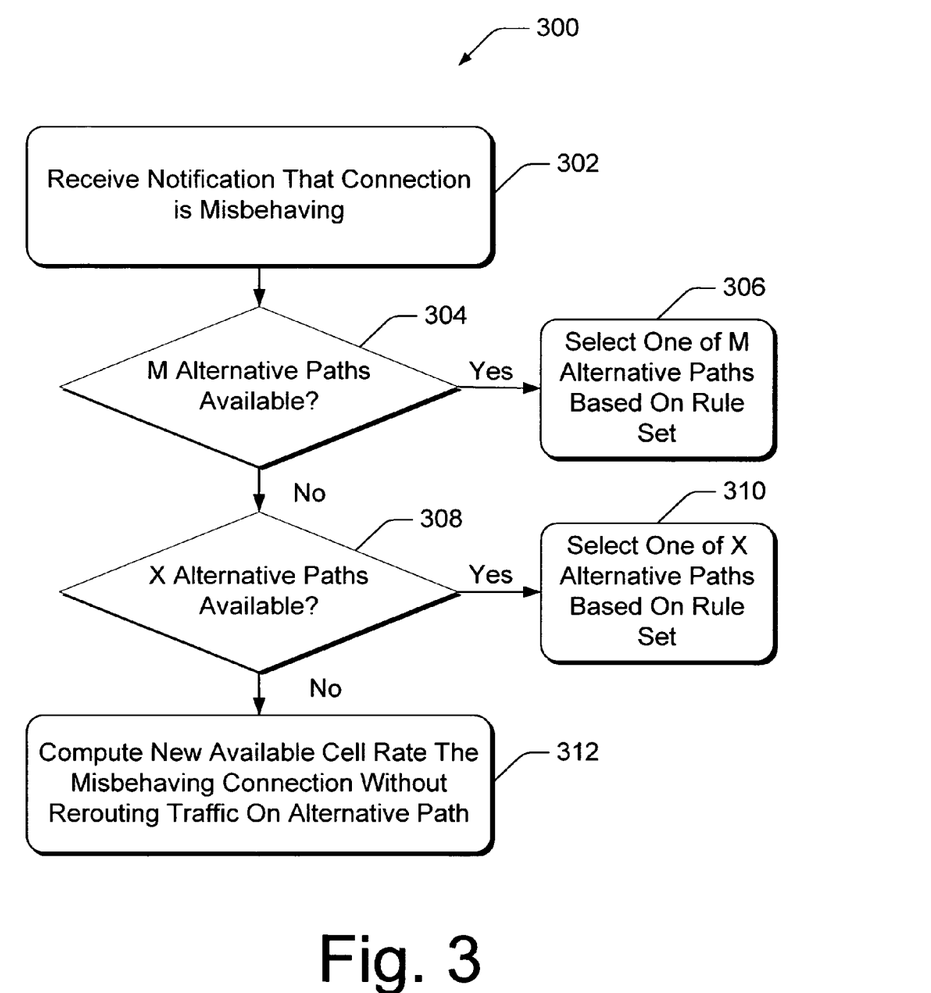
FIG. 3 illustrates an exemplary method for performing congestion control by rerouting misbehaving connections in a packet-switching network.

FIG. 3 illustrates an exemplary method 300 for performing congestion control by rerouting misbehaving connections in a connection-oriented packet-switching network, such as an ATM network described above. Method 300 includes blocks 302, 304, 306, 308, 310, and 312. The order in which the method is described is not intended to be construed as a limitation, and any number of the described method blocks can be combined in any order to implement the method. Furthermore, the method can be implemented in any suitable hardware, software, firmware, or combination thereof.

In block 302, a congestion notification is received that a non-real time connection with a Peak Cell Rate (PCR) of $R_{PCR}$ and a Minimum Cell Rate (MCR) of $R_{MCR}$ has been considered as misbehaving. Suppose the connection had an Available Cell Rate of $R_{ACR}$ at that time. For example, a source node may receive notification of traffic congestion at an intermediary node (point-of-congestion) located in the connections first path connecting a source node and a destination node. The first path is a non-real time connection with a Peak Cell Rate (PCR) of $R_{PCR}$ and Minimum Cell Rate (MCR) of $R_{MCR}$.

In decisional block 304, a decision is made whether M alternative paths exist with available resources able to satisfy the $R_{ACR}$ for transferring traffic between the source node and the destination node, where M represents any number greater than or equal to 1. Also the physical capacity (not the available capacity) of the path must be able to support the Peak Cell Rate ($R_{PCR}$) of the connection. It should be noted for any given path the available resources (i.e., bandwidth) define the maximum value that can be achieved for $R_{ACR}$.

If according to the YES branch of decisional block 304, M alternative paths exist with available resources able to satisfy the $R_{ACR}$ for transferring traffic, then method 300 proceeds to block 306. If according to the NO branch of decisional block 304, no M alternative paths exist with available resources able to satisfy the $R_{ACR}$ for transferring traffic, then method 300 proceeds to block 308.

In block 306, one of the M alternative paths is selected to reroute the traffic between the source node and the destination node. If more than one of the M alternative paths exist, then one or more rules may be used to select a particular one of the M alternative paths. For example, routing-controller 108 (FIG. 1) will use one or more rules 112 (FIG. 1) contained in a rule module 114 (FIG. 1) to select one of the possible alternative paths. Any number of implementation specific rules may be used to decide which of the multiple paths to choose. At this point, the alternative path finally selected can be mapped to the new $R_{ACR}$ for transferring traffic, and the connection between the source node and destination can continue to send traffic until another notification of traffic congestion is received.

In decisional block 308, a decision is made whether X alternative paths exist with available resources able to satisfy a reduced Cell Rate (ACR) of $R'_{ACR}$, even though the M alternative paths do not exist, according to the NO branch of decisional block 304. $R'_{ACR}$ represent a new ACR that, is greater than the reduced ACR ($R'_{ACR\_NEW}$) A for the connection if rate control is instituted to eliminate the traffic congestion instead of selecting an alternative route. It is noted that $R_{ACR}$ is greater than $R'_{ACR}$, but $R'_{ACR}$ is greater than $R'_{ACR\_NEW}$. In other words $R'_{ACR}$ is better than the worst-case scenario in which the cell rate $R'_{ACR\_NEW}$ is determined by throttling back the source node to alleviate the point-of-congestion without selecting an alternative path.

If according to the YES branch of decisional block 308, X alternative paths exist with available resources able to satisfy the $R'_{ACR}$ for transferring traffic, then method 300 proceeds to block 310. If according to the NO branch of decisional block 308, no X alternative paths exist with available resources able to satisfy the $R'_{ACR}$ for transferring traffic, then method 300 proceeds to block 312.

In block 310, one of the X alternative paths is selected to reroute the traffic between the source node and the destination node. If more than one of the X alternative paths exists, then one or more rules may, again, be used to select a particular one of the X alternative paths. For example, routing-controller 108 (FIG. 1) will use one or more rules 112 (FIG. 1) contained in a rule module 114 (FIG. 1) to select one of the possible alternative paths. Any number of implementation specific rules may be used to decide which of the multiple paths to choose. At this point, the alternative path finally selected can be mapped to the new $R'_{ACR}$ for transferring traffic, and the connection between the source node and destination can continue to send traffic until another notification of traffic congestion is received.

In block 312, if it is determined that no X alternative paths are available to satisfy the $R'_{ACR}$ for transferring traffic from decisional block 308, then as a default, a new ACR $R'_{ACR\_NEW}$ is computed for the original path such that the connection between the source node and destination node can continue to send traffic but at a reduced rate of the new ACR. In this situation the new ACR $R'_{ACR\_NEW}$ is less than $R'_{ACR}$. It should be noted at any given time a connection's ACR is greater than or equal to the specified Minimum Cell Rate (MCR) and less then equal to the specified Peak Cell Rate (PCR).

It is noted that various operations described with reference to method 300 may be performed simultaneously or in a different order. For example, the steps associated with performing decisional blocks 304 and 308 may be combined and performed simultaneously.

Thus, method 300 offers advantages over conventional methods for performing congestion control, by rerouting misbehaving connections over alternative paths which have unused available resources. This can improve overall network performance in terms of usage efficiency. Non-real time traffic that traditionally undergoes rate control can benefit from method 300, which provides better throughput for such traffic. Though not explicitly mentioned it should be appreciated that designing a proper network topology with multiple interconnections between network nodes is recommended in order to support multiple or alternative paths between two endpoints.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for performing congestion control in a node in a connection-oriented packet-switching network, the method comprising:

determining that there is an indication of traffic congestion in a first path connecting a source node and a destination node for a communication session, wherein the first path is a non-real time connection with an available cell rate of $R_{ACR}$;

the source node ascertaining whether M alternative paths exist with available resources able to satisfy the $R_{ACR}$ for transferring traffic between the source node and the destination node, wherein M is equal to or greater than 1;

the node selecting one of the M alternative paths to reroute the traffic between the source node and the destination node if the M alternative paths exist;

the source node ascertaining whether X alternative paths exist with available resources able to satisfy a reduced Available Cell Rate of $R'_{ACR}$, if M alternative paths do not exist, wherein $R'_{ACR}$ is less than the $R_{ACR}$, but is greater than a new available cell rate for the first path if rate control were instituted to eliminate the traffic congestion; and the source node selecting one of the X alternative paths to reroute the traffic between the source node and the destination node if the X alternative paths exist, the selected alternative path replacing the first path for a remainder of the communication session.

2. The method as recited in claim 1, wherein selecting one of the M alternative paths to reroute the traffic, comprises selecting one of the M alternative paths with a maximum amount of unreserved resources to satisfy the $R_{ACR}$, if there is more than one of the M alternative paths.

3. The method as recited in claim 1, wherein selecting one of the M alternative paths to reroute the traffic, comprises selecting one of the M alternative paths with a least amount of unreserved resources but enough unreserved resources to support the $R_{ACR}$, if there is more than one of the M alternative paths.

4. The method as recited in claim 1, wherein selecting one of the M alternative paths to reroute the traffic, comprises selecting a first one of the M alternative paths found to satisfy the $R_{ACR}$, if there is more than one of the M alternative paths.

5. The method as recited in claim 1, wherein selecting one of the M alternative paths to reroute the traffic, comprises selecting one of the M alternative paths that satisfies the $R_{ACR}$ according to one or more custom criteria, if there is more than one of the M alternative paths.

6. The method as recited in claim 1, wherein selecting one of the M alternative paths to reroute the traffic, comprises selecting one of the M alternative paths that satisfies the $R_{ACR}$ according to one or more fuzzy rules, if there is more than one of the M alternative paths.

7. One or more computer-readable storage media having stored thereon computer executable instructions that, when executed by one or more processors, causes the one or more processors to:

determine that there is an indication of traffic congestion in a first path connecting a source node and a destination node for a communication session, wherein the first path is a non-real time connection with a Minimum Cell Rate ($R_{MCR}$) and Peak Cell Rate (PCR) of $R_{PCR}$;

ascertain whether M alternative paths exist with available resources able to satisfy the $R_{PCR}$ for transferring traffic between the source node and the destination node, wherein M is equal to or greater than 1;

select one of the M alternative paths to reroute the traffic between the source node and the destination node if the M alternative paths exist, the selected one of the alternative paths replacing the first path for a remainder of the communication session;

ascertain whether X alternative paths exist with available resources able to satisfy a reduced Available Cell Rate of $R'_{ACR}$, if M alternative paths do not exist, wherein $R'_{ACR}$ is less than the $R_{ACR}$, but is greater than a new available cell rate for the first path if rate control were instituted to eliminate the traffic congestion; and select one of the X alternative paths to reroute the traffic between the source node and the destination node if the X alternative paths exist, the selected alternative path replacing the first path for a remainder of the communication session.

8. The method as recited in claim 1, wherein selecting one of the M alternative paths to reroute the traffic, comprises selecting one of the M alternative paths which best satisfies the $R_{ACR}$ in accordance with one or more rules, if there are more than one of the M alternative paths.

9. A system, comprising:

means for determining that there is an indication of traffic congestion in a first path connecting a source node and a destination node for a communication session, wherein the first path is a non-real time connection with an available cell rate of $R_{ACR}$;

means at the source node for ascertaining whether M alternative paths exist with available resources able to satisfy the $R_{ACR}$ for transferring traffic between the source node and the destination node, wherein M is equal to or greater than 1;

means at the source node for selecting one of the M alternative paths to reroute the traffic between the source node and the destination node if the M alternative paths exist, the selected one alternative path replacing the first path for a remainder of the communication session;

means for ascertaining whether X alternative paths exist with available resources able to satisfy a reduced Available Cell Rate of $R'_{ACR}$, if M alternative paths do not exist, wherein $R'_{ACR}$ is less than the $R_{ACR}$, but is greater than a new available cell rate for the first path if rate control were instituted to eliminate the traffic congestion; and means for selecting one of the X alternative paths to reroute the traffic between the source node and the destination node if the X alternative paths exist.

10. The method of claim 1, comprising receiving a notification of traffic congestion at the source node.

11. The system of claim 9, wherein the source node is configured to receive a notification of traffic congestion.

* * * * *